Dec. 21, 1937.  J. T. SHIMMIN  2,102,652
TRAVELING MAT CONCENTRATOR
Filed March 23, 1936  2 Sheets-Sheet 2
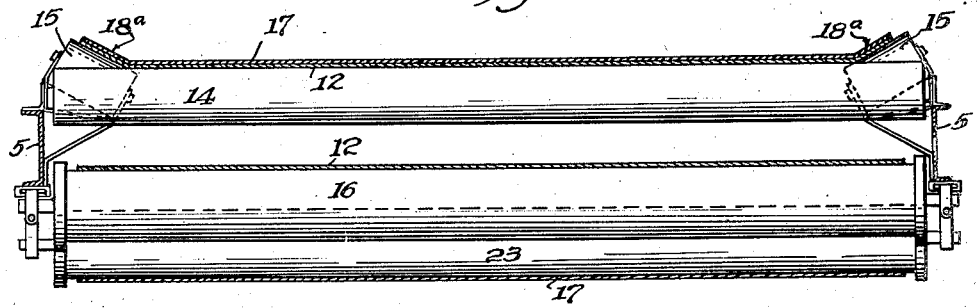
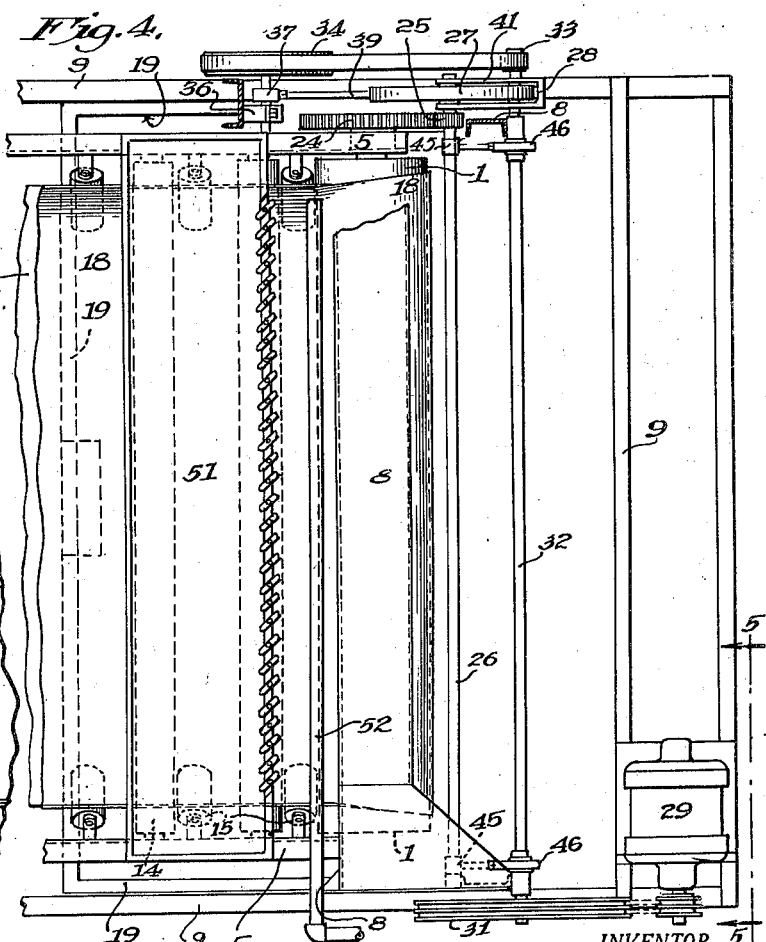
INVENTOR.
John T. Shimmin,
BY
ATTORNEYS.

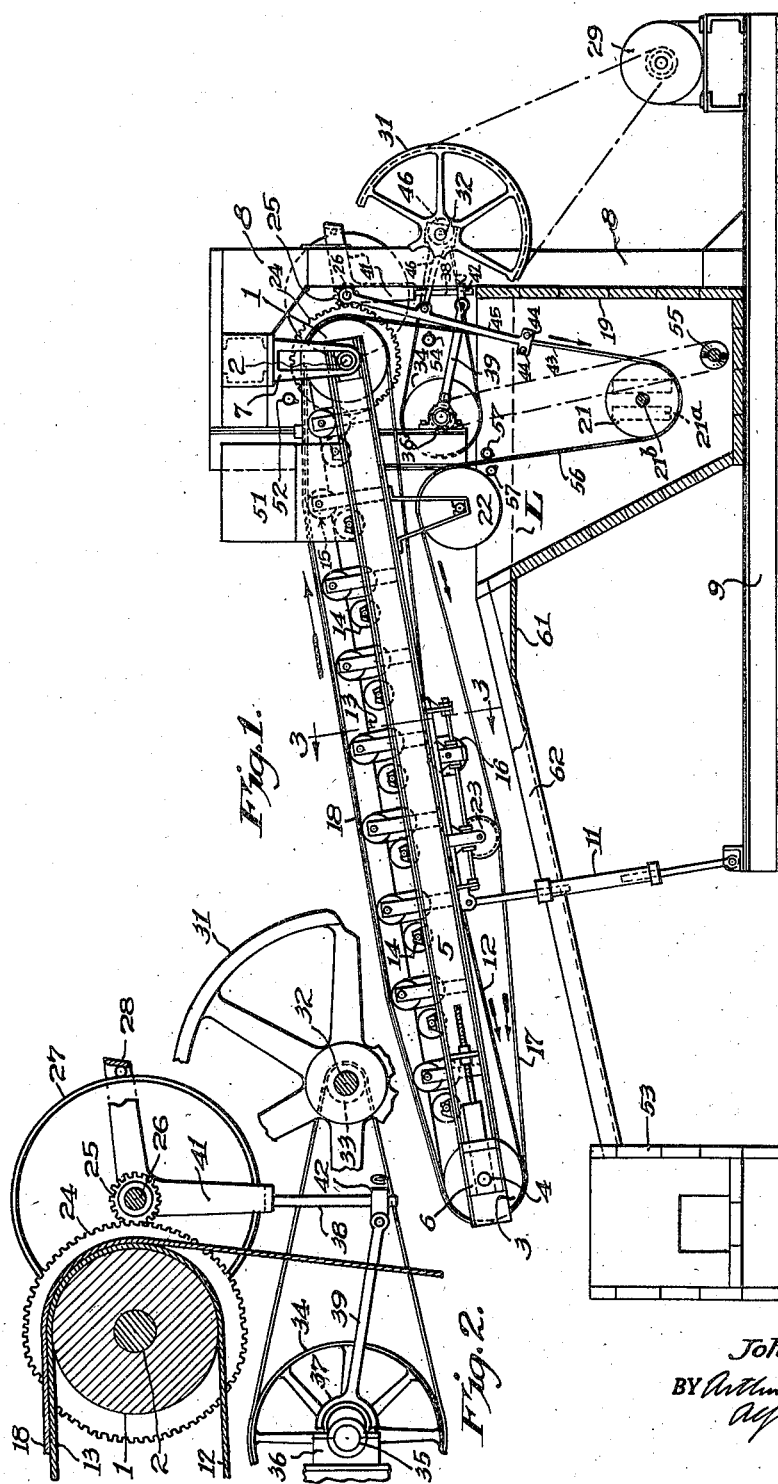

Patented Dec. 21, 1937

2,102,652

UNITED STATES PATENT OFFICE 2,102,652

TRAVELING MAT CONCENTRATOR

John T. Shimmin, Buchans, Newfoundland; Daisy M. Shimmin administratrix of said John T. Shimmin, deceased Application March 23, 1936, Serial No. 70,452

8 Claims. (Cl. 209—430)

This invention relates to a continuous traveling-mat concentrator, and pertains particularly to an apparatus for recovering values from a mineral through the agency of a traveling value-collecting means.

The apparatus of the present invention is adapted to be employed in the separation of heavy mineral values from a comminuted ore containing the same, and may employ a traveling collector medium of the type known as "corduroy cloth". In hitherto-suggested types of traveling-mat concentrators, corduroy collecting blankets have been provided with an integral backing member, as by securing a layer of rubber or the like thereto, to impart adequate mechanical strength, and considerable difficulty has been experienced in obtaining a continuous effective dislodgement of finely divided mineral values from the collecting medium, and a frequent shut-down has been generally found required for a thorough cleaning thereof, as by scrubbing the same by hand.

The principal object of this invention is to provide a traveling-mat concentrator in which more effective removal of collected values from the collecting medium is obtained, than has hitherto been found possible.

According to the present invention, I accomplish this object by providing an apparatus having a continuous corduroy mat or the like acting as a collecting medium, and an advantageous form of supporting means for such mat during its action as a collecting medium, and in which the mat is removed from contact with the supporting means during a portion of its travel to facilitate effective removal of collected values therefrom.

The apparatus of the present invention may comprise, essentially an endless carrier belt arranged along an inclined plane, and carrying an endless collecting belt along its upper surface, the upper runs of the collecting and carrier belts thus lying in frictional engagement with one another, with the upper run of the collecting belt constituting the collecting run or portion of the apparatus. The lower run of the collecting belt is removed from the lower run of the carrier belt, to form a loop-like portion located below the carrier belt, and washing means are provided at this loop-like portion to secure an effective washing of the collecting medium to remove the collected values therefrom. The collecting run of the belt is preferably moved upwardly along the established incline, and the comminuted ore containing the collectible values is fed upon said collecting run near the upper end thereof, together with the desired quantity of water or other liquid to assist the gravity separation of the values from the gangue material. The aforesaid loop-like portion of the collecting belt, carrying the collected values, is preferably carried through a body of water or other liquid, and is preferably also subjected to pronounced agitation as it enters such liquid body, to effect a disengagement of the value-particles therefrom, either with or without the assistance of water-sprays or the like playing on the belt itself.

Other objects and features of the invention will be brought out in the following description of a preferred embodiment thereof, or will be apparent therefrom. The accompanying drawings illustrate such preferred embodiment, and referring thereto:

Fig. 1 is a partly broken away side elevation of the device, showing the general arrangement of parts;

Fig. 2 is an enlarged scale detail of the head end portion thereof, showing the means for advancing the traveling mat;

Fig. 3 is a transverse detail of the apparatus taken on line 3—3 in Fig. 1;

Fig. 4 is a partly broken-away plan view of the head end of the device; and

Fig. 5 a broken away end elevation taken on line 5—5 in Fig. 4.

Referring to the drawings, the apparatus may comprise a table structure including a head drum 1 carried on a shaft 2, and a tail drum 3 carried on a shaft 4, said shafts being rotatably disposed on the respective ends of two longitudinal frame members 5, one on each side of the device, and the bearing 6 for the tail shaft 4 is preferably slidably mounted upon the side members 5 to provide for longitudinal movement thereof in adjustment of the tension of the traveling belt subsequently described. The head shaft 2 is preferably mounted in suitable hangers 7 supported through the agency of a suitable frame structure 8 secured to a bed 9, and the tail end of the table structure is preferably carried by a pair of struts 11 each pivotally mounted on the bed 9 at their lower ends and pivotally secured to the members 5 at their upper ends, as shown particularly in Fig. 1. The plane of the table structure, and more specifically, the plane of the collecting run of the apparatus, as defined by the upper surface of the ascending run of the collecting medium, subsequently described, is preferably disposed at an inclination to the horizontal, the head end of the device being elevated above the tail end, and in view of the fact that the degree of inclination is preferably varied under different usages, the struts 11 are preferably adjustable in length so as to provide a regulation of the inclination of the apparatus.

An endless carrier belt is provided for the apparatus, extending over the head and tail drums as at 12, the upper run 13 of which is supported by a plurality of rollers or the like 14, and, as shown more particularly in Figs. 3 and 4, I preferably also provide a plurality of inclined side rollers 15 intermediate the rollers 14 to provide a troughed shape to the ascending run of the carrier belt as shown at 18ᵃ. A suitable support roller 16 may be provided on the lower or descending run of the belt 12, if desired.

The collecting medium which may comprise a fluid-pervious material provided or not with rifflelike projections, such as a corduroy cloth, is formed as an endless belt 17 which extends over the head and tail drums and is carried by and supported along its ascending run 18 by the carrier belt 12. The collecting medium is pulled away from the carrier belt 12 at the forward portion of the head drum 1 and loops downwardly at its value-discharging portion into a concentrate bin 19, preferably under a weighted idler 21, thence over an idler 22 to the tail drum 3. An auxiliary idler may be provided as at 23 along the return run of the collecting medium if desired. The idler drum 21 is preferably adapted to rest upon and be carried by the belt portion 43, and may be preserved against lateral displacement through the agency of guide members 21ᵃ mounted on the bin 19 and engaging the projecting ends of the idler shaft 21ᵇ.

The carrier belt is preferably moved by positive rotation of the head drum 1, and the driving means therefor may comprise a gear 24 mounted on the shaft 2 and driven by a gear 25 mounted on a jack-shaft 26 rotatably secured to the frame structure 8 and carrying a flat faced pulley 27 driven by means of a roller type friction ratchet 28. A driving motor may be provided as at 29, belted to a driven pulley 31 carried on a shaft 32, mounted on the frame 8 and provided with a drive pulley 33 belted to a pulley 34 carried on a shaft 35 extending transversely to the apparatus. The shaft 35 may be mounted to the frame structure 8 as at 36 and carries an eccentric 37 secured to a ratchet arm 38 through a connecting rod 39, said ratchet arm 38 being provided with a bifurcated portion 41 pivotally mounted on the shaft 26, surrounding the pulley 27 and terminating in the aforesaid ratchet 28. The connecting rod 39 is preferably adjustably secured to the arm 38, as at 42, whereby the length of stroke of the ratchet 28 may be controlled within limits. It will be understood that operation of the motor 29 will effect a reciprocating movement of the arm 38 through the eccentric 37, producing successive rotational movements of the flat faced pulley 27 and thus intermittingly advancing the head drum 1. Any other type of driving means may obviously be provided, driving on any desired portion of the carrier belt 12, as will be apparent to one skilled in the art.

Along the descending or looped value-discharging portion 43 of the collecting belt 17, within the concentrate bin 19 and preferably adjacent the water level L maintained within said bin, I provide a beater or agitator mechanism adapted to produce a fairly rapid transverse movement of said collecting medium through the water contained in said bin. For this purpose I may provide two spaced transverse rods 44, one disposed at each side of the belt portion 43, and extending across the width of said belt portion. The rods 44 are carried at their outer ends by agitator arms 45 at each side of the device, pivotally mounted on the frame structure 8 as upon the shaft 26, and linked to the shaft 32 through the agency of a pair of eccentrics 46, whereby, upon rotation of the pulley 31, a forth-and-back movement will be effected at the rods 44 and due to the engagement of these rods upon opposite sides of the belt portion 43, said belt will be given the above-prescribed movement through the water in the concentrate bin.

In the operation of the device, a pulp comprising a comminuted ore and water or other suitable liquid is distributed across the face of the belt portion 18 adjacent the head end of the device through the agency of a feeder 51 located above the belt. Between the feeder and the head end of the belt a number of small jets of water are preferably caused to play on the belt surface, said water being supplied through a spray line 52. Alternatively, water may be supplied to the belt surface by means of a conventional water distributing box, according to established practice in connection with vanners. The pulp, diluted with water from the aforesaid jets, will flow gently down the inclined surface 18 of the collecting medium and the heavier particles of mineral are gravity separated from the lighter particles and find lodgement in the transversely extending corduroy riffles, or other collecting agency, dependent upon the surface character of the said collecting medium, according to common practice. The deposited mineral is carried past the water jets and enters the concentrate bin at the value-discharging portion 43 of said belt, said jets of water being effective in washing away adhering particles of non-value-bearing sands, which are caused to flow downwardly along the ascending run of the collecting medium and are ultimately discharged over the tail drum 3 into a tailings box 53. It will be appreciated that some of the finer value-bearing particles may be carried for an appreciable distance down the incline of the belt 18, but it will be further appreciated that the inclination of said belt, the rate of advance thereof, and the volume of water flowing over the same will be regulated according to a particular operating condition so that a desired maximum of value-bearing particles will be caught by the collecting medium, whereby the value content of the rejected tails is kept at a desirable minimum.

A water spray is preferably provided at 54 playing against the back or inner side of the belt portion 43 above the water level L, to assist in the loosening of adhering particles therefrom before the belt is passed below the level L, serving to force water through the pervious belt from the rearward side and dislodge deeply-seated particles from the mesh or pile of the cloth. The aforesaid spray means cooperates with the washing agitator means to provide an adequate washing of the value-discharging portion of the collecting belt. In the event that a fluid-impervious value-collecting medium is employed, the washing means at 54 may be dispensed with, and the agitator assembly 44—46 relied upon to effect the desired washing. Due to the action of the agitator rods 44, the collecting medium is thoroughly agitated against the water in the concentrate bin 19 and the adhering mineral particles are effectively loosened therefrom and are allowed to fall to the bottom of said bin, whence they may be withdrawn through the agency of a suitable screw conveyor or the like such as shown at 55, said conveyor being conveniently driven from the shaft 35. The portion 56 of the collecting medium which rises from the concentrate bin 19 may be subjected to a fairly vigorous washing at a point above the water level L, as by means of water sprays 57, if desired, so that any residual adhering particles are washed into said bin. The water level L is conveniently maintained within the bin 19 through the agency of an overflow 61 communicating with an overflow or discharge launder 62 which may extend from the upper portion of said bin to the tail box 53.

It will be appreciated that the apparatus of the present invention is subject to modification, dependent upon the use to which it is subjected. For example, a "vanning" motion may be produced at the collecting run of the apparatus, providing either a transverse or longitudinal reciprocating movement, according to conventional practice, without departing from the spirit of this invention.

According to the present invention, the collecting medium such as a fluid-pervious corduroy cloth or the like, may be employed to its greatest efficiency in the value-collecting zone, namely, along the ascending run 18 thereof, due to the fact that the full value-collecting ability of the material is employed. Inasmuch as it has hitherto been considered necessary to provide some form of backing for the corduroy cloth so that a reasonable life is obtained, the cloth is rendered relatively impervious, whereby water sprays can not freely flush through the cloth, and the use of water sprays on the riffled surface following a collecting operation serves to drive the fine particles more deeply into the material. Likewise, water sprays directed on the back side of the cloth have no effect whatever in loosening the particles. According to the present invention, the collecting medium is provided with an adequate support throughout the collecting run thereof and this support is removed from contact or engagement with the collecting medium after the collecting operation, so that the collecting medium may be subjected to an efficient washing operation to dislodge adhering particles. According to the present invention the collecting medium is returned to the collecting zone in a relatively clean condition, whereby the flow of water over the tail end of the device will not result in introducing previously-collected values into the rejected tails, and an improved collecting efficiency is therefore realized, with respect to both collection capacity and thoroughness of collection.

The carrier belt may comprise any suitable material adapted to withstand the existing operating stresses when wet, such as a fabric base material embedded in a vulcanized rubber matrix, or a vulcanized crepe rubber having an irregular surface texture which will assist in providing driving engagement of the carrier belt with the value-collecting belt along the collecting run thereof. The carrier belt is preferably maintained under adequate tension to insure the desired movement thereof by the head drum, as by adjusting the movable tail bearing 6, or suitable weighted or spring biased idler means may be provided to maintain a desired tension. The tension in the collecting belt may be relatively slight, being due primarily to the idler 21, and it will be appreciated that such tension may be established at a very low value by adjusting the weight of said idler, for example, by employing an air-tight drum into which a controlled proportion of water may be admitted until the weight of such idler plus the contained water is adjusted at a desired value.

I claim:

1. A traveling-mat ore concentrator, which comprises: an inclined table structure provided with head and tail drums at the upper and lower ends thereof, respectively; an endless carrier belt mounted on said table, extending over said head and tail drums, and having an ascending run above said table and a descending run below said table; driving means for said carrier belt to cause movement thereof in an upward direction along said ascending run; an endless value-collecting belt of greater length than said carrier belt and having a collecting portion resting upon and carried by said ascending run of said carrier belt and a value-discharging portion extending below and removed from said descending run of said carrier belt; feed means for supplying a value-containing ore and water to said collecting portion adjacent the upper end of said table; a concentrate bin disposed below said table; means for maintaining a body of water in said concentrate bin; idler means engaging said value-discharging portion of said collecting belt to cause said portion to enter said bin and extend below the level of water therein; agitator means positioned between said head drum and said idler means and operable to engage each of the opposite faces of said value-collecting belt at said value-discharging portion thereof; and means operatively associated with said agitator means to effect a positive forth and back movement thereof transverse to the faces of said value-collecting belt whereby said value-discharging portion of said belt is given a positive forth and back movement transverse to the faces thereof.

2. The concentrator set forth in claim 1, said agitator means comprising two spaced rods extending across the faces of said collecting belt at opposite sides thereof, and means constraining said rods to move as a unit.

3. The concentrator set forth in claim 1, said agitator means being disposed within said body of water in said concentrate bin.

4. A traveling-mat ore concentrator, which comprises: an inclined table structure provided with head and tail drums at the upper and lower ends thereof, respectively; an endless carrier belt mounted on said table, extending over said head and tail drums, and having an ascending run above said table and a descending run below said table; driving means for said carrier belt to cause movement thereof in an upward direction along said ascending run; an endless value-collecting belt of greater length than said carrier belt and having a collecting portion resting upon and carried by said ascending run of said carrier belt and a value-discharging portion extending below and removed from said descending run of said carrier belt; feed means for supplying a value-containing ore and water to said collecting portion adjacent the upper end of said table; a concentrate bin disposed below said table; means for maintaining a body of water in said concentrate bin; idler means engaging said value-discharging portion of said collecting belt to cause said portion to enter said bin and extend below the level of water therein; agitator means positioned between said head drum and said idler means and operable to engage each of the opposite faces of said value-collecting belt at said value-discharging portion thereof; means operatively associated with said agitator means to effect a positive forth and back movement thereof transverse to the faces of said value-collecting belt whereby said value-discharging portion of said belt is given a positive forth and back movement transverse to the faces thereof; and washing means disposed below said table structure for washing collected adhering values from said value discharge portion of said collecting belt and into said concentrate bin.

5. The concentrator set forth in claim 4, said collecting belt comprising a fluid-pervious fabric member, and said washing means comprising water spray means disposed inwardly of the loop formed by said endless collecting belt, and directed outwardly against the inner surface of said belt at a position between the head drum and said concentrate bin.

6. A traveling-mat concentrator, which comprises: an inclined table structure provided with head and tail drums at the upper and lower ends thereof, respectively; an endless carrier belt mounted on said table, extending over said head and tail drums, and having an ascending run above said table and a descending run below said table; driving means for said carrier belt to cause movement thereof in an upward direction along said ascending run; a concentrate bin disposed below said table adjacent the head end thereof; means for maintaining a body of water in said concentrate bin; an endless value-collecting belt of greater length than said carrier belt and having a collecting portion resting upon and carried by said ascending run of said carrier belt, and a value-discharging portion looped downwardly from adjacent said head drum and into said body of water within said concentrate bin; agitator means in position to engage the descending run of said downwardly looped value-discharging portion of said collecting belt, said agitator means being adapted to cause positive reciprocating movement of said descending run through said body of water in a direction transverse to the face thereof; driving means for operating said agitator means; and feed means for supplying a value-containing ore and water to said collecting portion adjacent the upper end of said table.

7. The concentrator set forth in claim 6, said agitator means comprising two spaced agitator members extending across the faces of said collecting belt at opposite sides thereof, said members being positioned to engage the respective sides of said belt to produce said positive reciprocating movement thereof at said descending run portion.

8. The concentrator set forth in claim 6, said value-collecting belt comprising a fluid-pervious fabric member, and said concentrator comprising in addition: water spray means disposed inwardly of said downwardly looped portion of said value-collecting belt and directed outwardly against the inner face of the descending run portion thereof at a position above the level of said body of water.

JOHN T. SHIMMIN.